US012691714B2

(12) United States Patent
Collyer et al.

(10) Patent No.: US 12,691,714 B2
(45) Date of Patent: Jul. 28, 2026

(54) RECESSED LEAF SPRING SUSPENSION SYSTEM

(71) Applicant: RASSINI SUSPENSIONES, S.A. DE C.V., Col. Molino del Rey (MX)

(72) Inventors: Brent Collyer, Northville, MI (US); Jose Guadalupe Ruiz Juarez, Coahuila (MX); Juan Pablo García Osuna, Coahuila (MX); Angel Fabian Mijangos, Coahuila (MX); Eddy Alfaro Lopez, Coahuila (MX); Juan Luis Zapata Nava, Coahuila (MX)

(73) Assignee: RASSINI SUSPENSIONES, S.A. DE C.V., County Molino del Rey (MX)

( * ) Notice: Subject to any disclaimer, the term of this patent is extended or adjusted under 35 U.S.C. 154(b) by 596 days.

(21) Appl. No.: 17/945,484

(22) Filed: Sep. 15, 2022

(65) Prior Publication Data

US 2023/0083976 A1     Mar. 16, 2023

Related U.S. Application Data

(60) Provisional application No. 63/244,793, filed on Sep. 16, 2021.

(51) Int. Cl.
B60G 11/113     (2006.01)
B60G 11/34     (2006.01)

(52) U.S. Cl.
CPC ............ B60G 11/113 (2013.01); B60G 11/34 (2013.01); B60G 2202/112 (2013.01); B60G 2206/70 (2013.01)

(58) Field of Classification Search
CPC ............ B60G 11/113; B60G 2204/121; B60G 2204/4306; B60G 2202/112; B60G 11/34; F16F 1/3683
(Continued)

(56) References Cited

U.S. PATENT DOCUMENTS

| | | | |
|---|---|---|---|
| 4,397,437 A | 8/1983 | Madej | |
| 4,750,718 A | 6/1988 | Nickel | |

(Continued)

FOREIGN PATENT DOCUMENTS

| | | |
|---|---|---|
| CN | 105946489 A | 9/2016 |
| CN | 106807793 A | 6/2017 |

(Continued)

OTHER PUBLICATIONS

Extended European Search Report regarding corresponding EP App. No. 22196083.4; issued Mar. 1, 2023.
(Continued)

*Primary Examiner* — Jason D Shanske
*Assistant Examiner* — Caitlin Anne Miller
(74) *Attorney, Agent, or Firm* — Dickinson Wright PLLC

(57) ABSTRACT

A leaf spring suspension system for a vehicle includes an axle. The leaf spring suspension system includes a leaf spring having a top side, a bottom side, and a pair of side edges, wherein at least one of the side edges defines a pair of recesses extending inwardly from the side edge. The leaf spring suspension system also includes a clamping assembly operatively coupling the leaf spring to the axle, the clamping assembly comprising a pair of U-shaped bars, wherein a portion of the U-shaped bars is disposed within the pair of recesses of the leaf spring.

13 Claims, 10 Drawing Sheets

(58) Field of Classification Search
USPC ......................................................... 267/52
See application file for complete search history.

(56) References Cited

U.S. PATENT DOCUMENTS

| | | | | |
|---|---|---|---|---|
| 4,801,129 | A * | 1/1989 | Wells .................... | F16F 1/3683 |
| | | | | 267/52 |
| 9,108,483 | B2 * | 8/2015 | Preijert .................. | B60G 11/12 |
| 10,994,581 | B2 * | 5/2021 | Keeler ................... | B60G 11/04 |
| 11,920,650 | B2 * | 3/2024 | Berlingieri ............ | B60G 11/113 |
| 2011/0017014 | A1 | 1/2011 | Batdorff | |
| 2012/0146309 | A1 * | 6/2012 | Fruhmann ............ | B60G 21/026 |
| | | | | 280/124.175 |
| 2014/0284856 | A1 * | 9/2014 | Stay ........................ | F16F 1/368 |
| | | | | 156/60 |
| 2016/0152106 | A1 * | 6/2016 | Preijert .................. | F16F 3/023 |
| | | | | 267/40 |
| 2018/0229567 | A1 | 8/2018 | Keeler et al. | |
| 2019/0118600 | A1 | 4/2019 | Gerhards | |

FOREIGN PATENT DOCUMENTS

| | | | |
|---|---|---|---|
| CN | 109693502 | A | 4/2019 |
| CN | 110027376 | A | 7/2019 |
| CN | 209743451 | U | 12/2019 |
| CN | 111215822 | A | 6/2020 |
| JP | S56-042406 | U | 9/1954 |
| JP | S62124099 | A | 6/1987 |
| JP | S62104036 | | 7/1987 |
| JP | S63195439 | A | 8/1988 |
| JP | S63251638 | A | 10/1988 |
| JP | H03035332 | U | 4/1991 |
| JP | 2005256082 | A | 9/2005 |
| JP | 2006142366 | A | 6/2006 |

OTHER PUBLICATIONS

Office Action regarding corresponding JP App. No. 2022-148496; issued Dec. 12, 2023.

Re-Examination Report regarding corresponding CN App. No. 2022-148496; dated Mar. 3, 2025.

First Office Action regarding corresponding CN App. No. 202211129992.9; issued Nov. 20, 2024.

* cited by examiner $$t2 = t1 * \left[\frac{1}{(b2 \,/\, b1)}\right]$$

$$Ks = 1 + \frac{2a}{b}$$

Stress Factor (Ks) by Oval Shape

(b/a)

Oval Shape Factor

$$\sigma\,max = \sigma\,nom\,(1 + 2a/b)$$
$$\sigma\,max < Safety\,Factor\,\sigma\,UTS$$

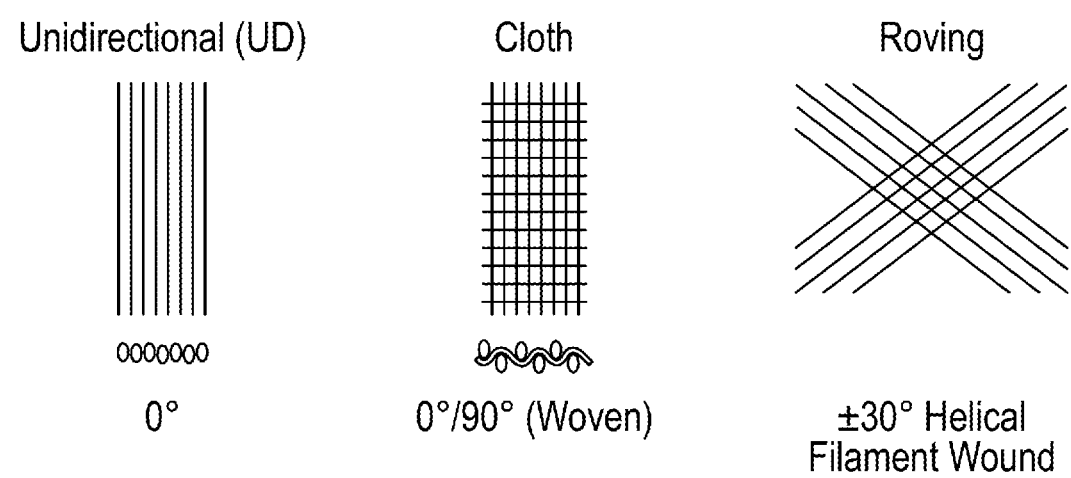
Unidirectional (UD)
0°
Cloth
0°/90° (Woven)
Roving
±30° Helical
Filament Wound
FIG. 10
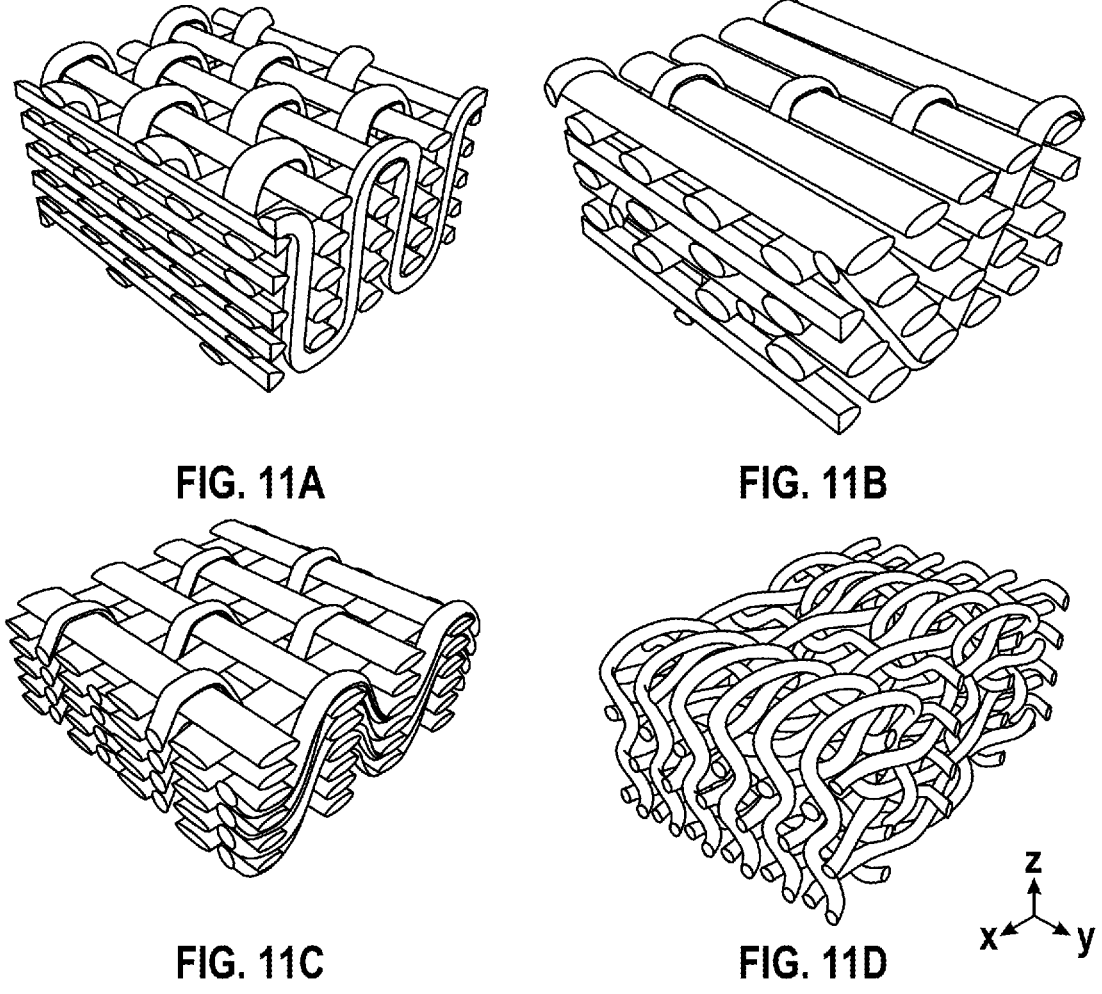
FIG. 11A
FIG. 11B
FIG. 11C
FIG. 11D

FIG. 12A                    FIG. 12B

RECESSED LEAF SPRING SUSPENSION SYSTEM

CROSS-REFERENCE TO RELATED APPLICATION

This application claims the benefits of priority to U.S. Provisional Patent Application Ser. No. 63/244,793, filed on Sep. 16, 2021, the disclosure of which is incorporated by reference herein in its entirety.

FIELD OF THE INVENTION

This invention relates generally to leaf spring suspension systems for vehicles and, more particularly, a leaf spring having a recess feature.

BACKGROUND

Leaf spring systems have for many years been used for the suspension of wheeled vehicles. The central element of a leaf spring suspension system for a vehicle is termed a "semi-elliptical" spring configured as an arc-shaped length of spring steel having a substantially rectangular cross-section. At the center of the arc is provided an arrangement for coupling to the axle of the vehicle. At the ends are provided coupler holes for attaching the spring to the vehicle body. For heavy vehicles, leaf springs are stacked on one another to form layers of springs of different lengths. Leaf springs are still used in heavy commercial vehicles and railway carriages. In the case of very heavy vehicles, leaf springs provide the advantage of spreading the load over a larger region of the vehicle's chassis. A coil spring, on the other hand, will transfer the load to a single point.

The well-known Hotchkiss drive employs a solid axle that is coupled at its ends to the centers of respective semi-elliptical leaf springs. A clamping assembly that includes several components attaches the leaf spring(s) to the axle. The clamping assembly typically includes a pair of U-bolts that extend along edges of the leaf spring to secure the overall assembly together. However, if the spring width is increased for any reason, such as a design change in a vehicle program, all clamping assembly components may be required to be changed, including an axle perch welded to the axle. These changes involve major changes that increase the time, complexity and possibly cost for various suspension programs.

SUMMARY OF THE INVENTION

According to one aspect of the disclosure, a leaf spring suspension system for a vehicle includes an axle. The leaf spring suspension system includes a leaf spring having a top side, a bottom side, and a pair of side edges, wherein at least one of the side edges defines a pair of recesses extending inwardly from the side edge. The leaf spring suspension system also includes a clamping assembly operatively coupling the leaf spring to the axle, the clamping assembly comprising a pair of U-shaped bars, wherein a portion of the U-shaped bars is disposed within the pair of recesses of the leaf spring.

According to another aspect of the disclosure, a method of designing a clamping assembly for a vehicle leaf spring suspension is provided. The method includes determining a width and thickness of a leaf spring. The method also includes determining a shape and dimension of a recess defined by a side edge of the leaf spring, the recess configured to receive a portion of a leg of a clamp bar therein.

These and other advantages and features will become more apparent from the following description taken in conjunction with the drawings

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 10 illustrates various continuous fibers arrangements for reinforcement structures in the recessed areas of the leaf spring;

FIG. 11 illustrates various woven structures for reinforcement structures in the recessed areas of the leaf spring;

FIG. 12A-12D illustrates knitted fabrics for reinforcement structures in the recessed areas of the leaf spring;

FIG. 13 illustrates an arrangement of auxetic fabrics for reinforcement structures in the recessed areas of the leaf spring;

DETAILED DESCRIPTION

Figure 1:
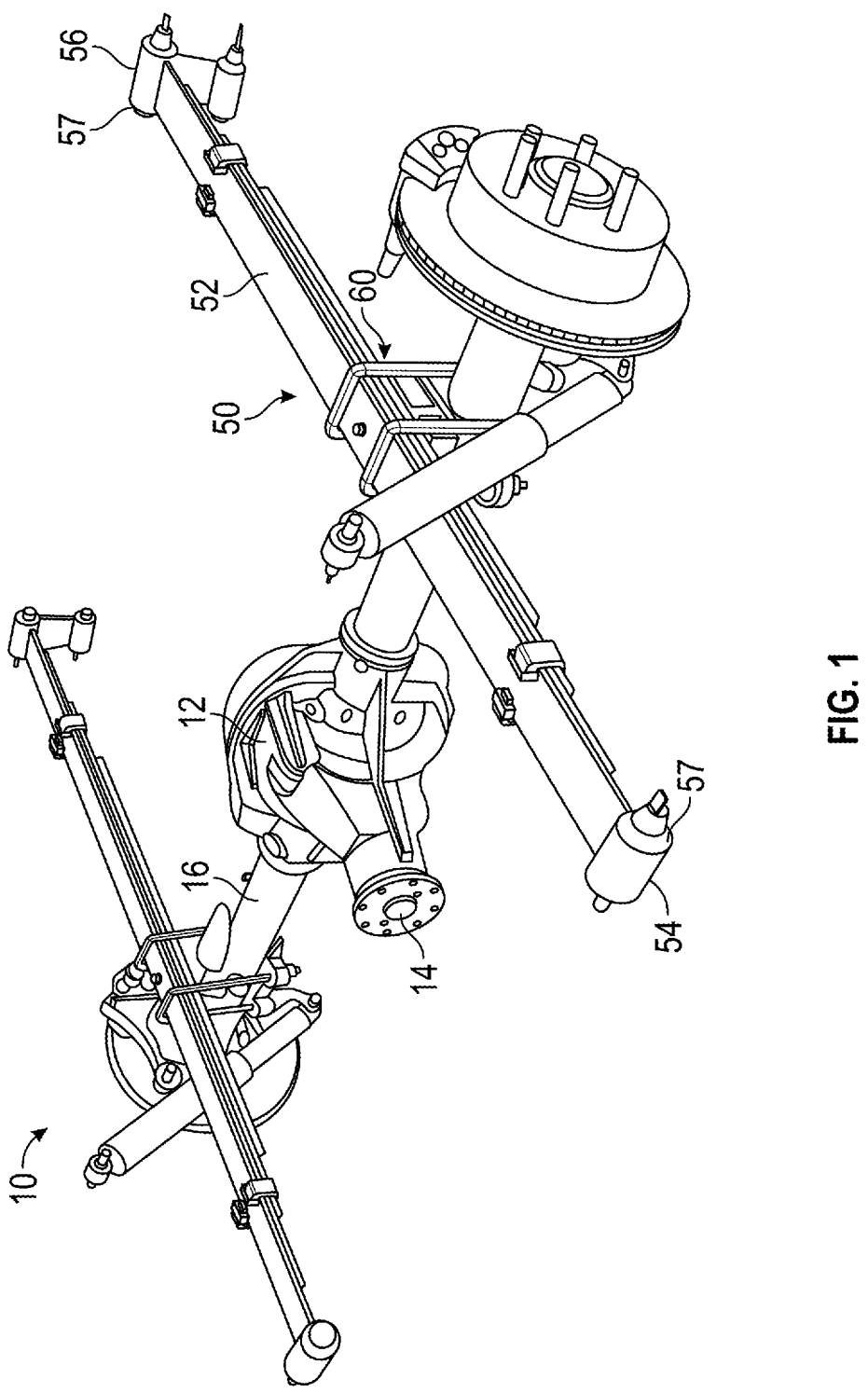
FIG. 1 is a perspective view of a portion of a vehicle leaf spring suspension system.

Referring to FIG. 1, the embodiments disclosed herein are utilized in a vehicle suspension system 10 having a chassis having chassis rails (not shown). The chassis rails are coupled to each other by one or more cross braces (not shown). A differential drive arrangement 12 is fixedly coupled to the chassis and converts the rotary motion of a propeller shaft 14 to substantially orthogonal rotary motion at axle 16. The axle 16 includes an associated pair of universal joints (not specifically designated) that are arranged to be proximal and distal with respect to the differential drive arrangement 12. Thus, the axle 16 has an associated longitudinal axis to accommodate transaxial motion. It is to be appreciated that the axle 16 refers to a pair of half shafts in some embodiments. The half shafts may be disposed within a single sleeve or uncovered.

The vehicle suspension system 10 includes a leaf spring arrangement 50. The leaf spring arrangement 50 refers to a single leaf spring in some embodiments and a plurality of leaf springs in other embodiments. In a multiple leaf spring arrangement, the leaf springs are stacked and operatively coupled to each other. Regardless of whether a single leaf spring is provided or if a plurality of leaf springs are present, the leaf spring arrangement 50 is located along, and coupled to, the axle 16.

The leaf spring(s) may be referred to as "semi-elliptical" springs configured as arc-shaped length segments. The leaf spring(s) are formed of a composite material to achieve a lighter weight of the system, relative to metal alternatives. However, it is contemplated that other materials are employed to form the leaf spring(s). For example, the leaf springs disclosed herein may be formed of a composite material, one or more metals, reinforced polymers, and other multi-material combinations. For purposes of clarity, a single leaf spring is described in detail herein and is referred to with numeral 52. It is to be appreciated that the disclosed embodiments may be applicable to more than one leaf spring in a multi-spring arrangement.

Disposed between a first end 54 and a second end 56 of the leaf spring 52 is a clamping assembly 60 to operatively couple the leaf spring 52 to the axle 16. The leaf spring 52 is operatively coupled at ends 54, 56 to the chassis rail in some embodiments. In particular, the leaf spring 52 is coupled to the chassis rail with any suitable coupling element. In some embodiments, the leaf spring 52 is operatively coupled at its ends 54, 56 to the chassis rail with an eye spring bushing arrangement 57.

Figure 3:
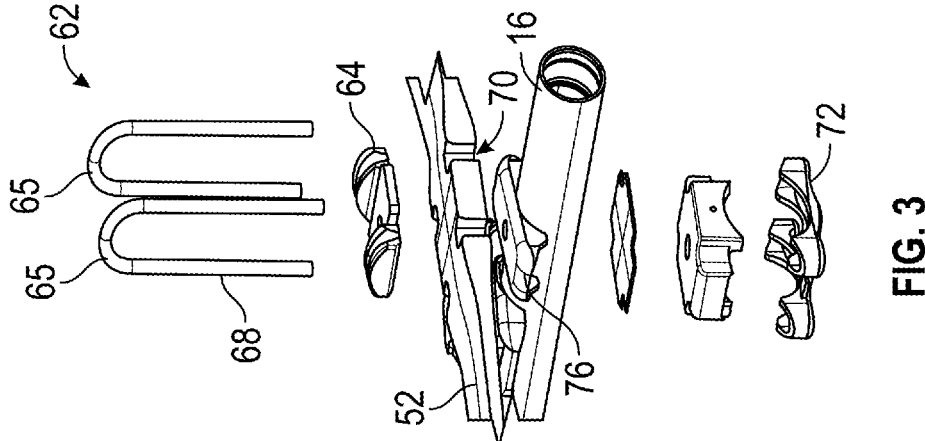
FIG. 3 is a perspective, disassembled view of the clamping assembly.
Figure 2:
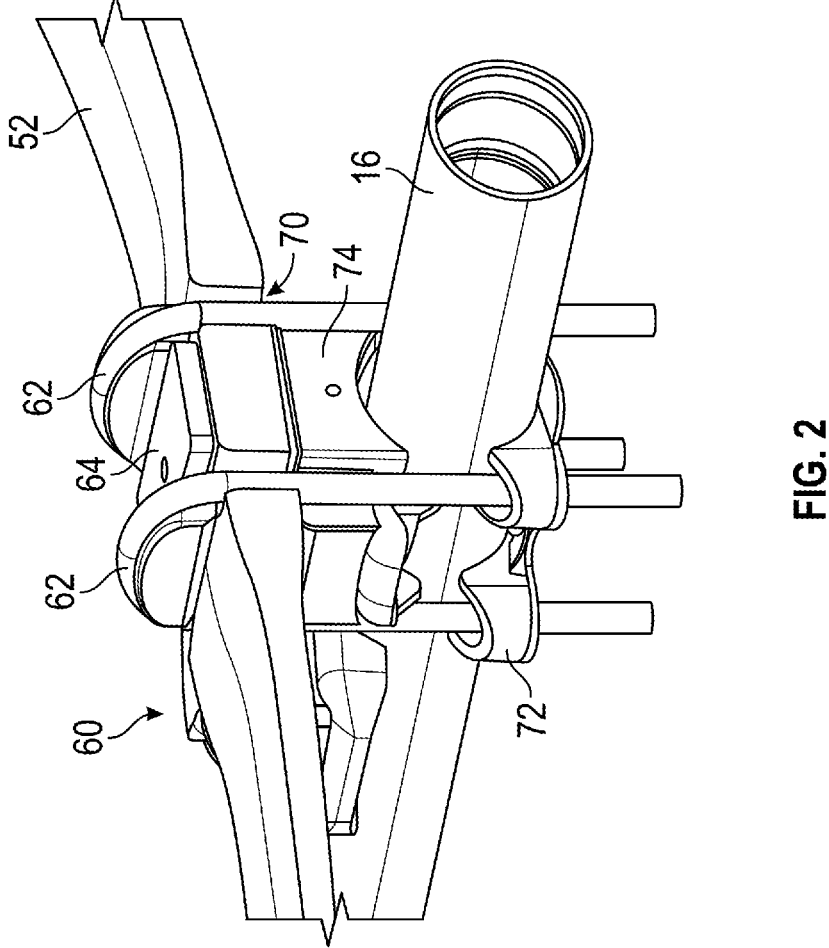
FIG. 2 is a perspective view of a clamping assembly of the vehicle leaf spring suspension system.

Referring now to FIGS. 2 and 3, the clamping assembly 60 is illustrated in greater detail. The clamping assembly 60 includes a pair of substantially U-shaped rods 62 that are similarly shaped in the illustrated embodiment. However, it is to be appreciated that alternative shapes of the clamping assembly components are contemplated. In some embodiments, the clamping assembly 60 is located proximate a lengthwise midsection of the leaf spring 52. A top plate 64 is located on a top side of the leaf spring 52 and includes grooves that accommodate the curved portions 65 of each U-shaped rod 62 therein. Substantially cylindrical segments 68 of each U-shaped rod 62 extend downwardly from the curved portion 65. Each cylindrical segment 68 is seated within a recess 70 defined on one or both sides of the leaf spring 52 and further downward to sandwich the top plate 64, the leaf spring 52, intermediate component(s) above the axle 16 and an anchor plate 72 together. The intermediate component(s) referenced herein may include one or more components located between a bottom side of the leaf spring 52 and the top of the axle 16. In the illustrated embodiment, a spacer 74 and an axle perch 76 are included, but it is to be appreciate that more of fewer components may be present.

Figure 4:
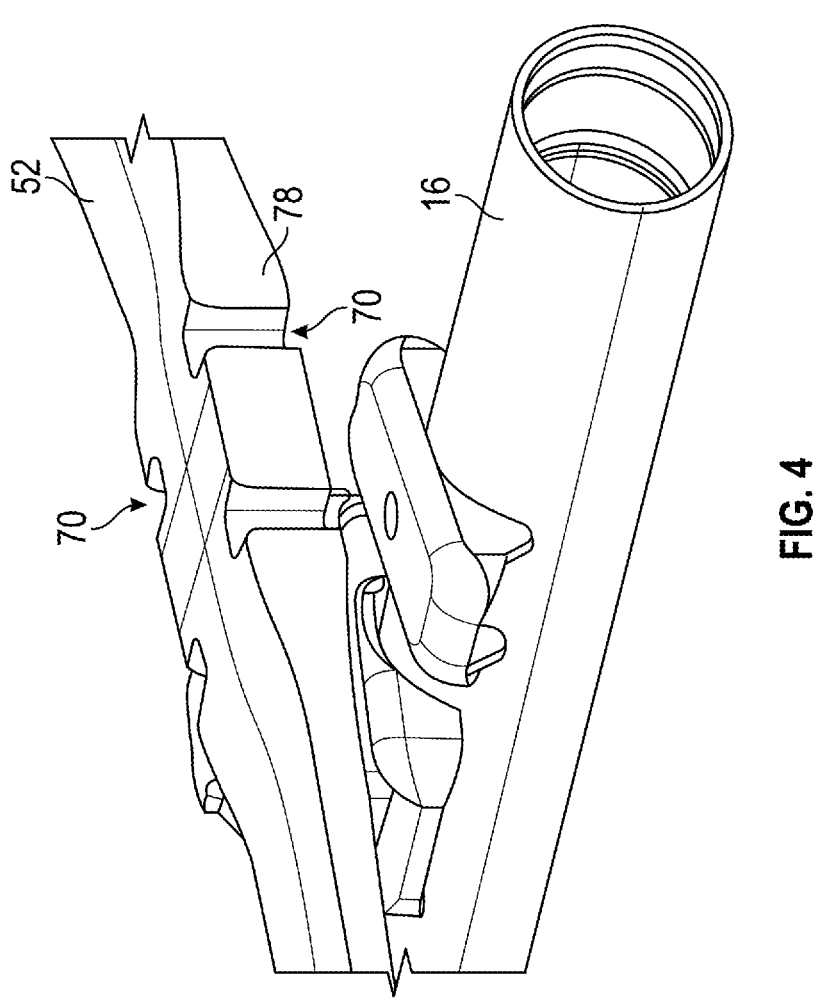
FIG. 4 is a perspective view of a leaf spring of the suspension system illustrating recesses to accommodate a portion of the clamping assembly.

Referring now to FIGS. 4 and 5, the region of the leaf spring 52 that accommodates the clamping assembly 60 is shown in greater detail with various components omitted for clarity. In particular, the recesses 70 of the leaf spring 52 are shown in greater detail. As described above, these recesses 70 are configured to accommodate the U-shaped rods 62 therein, in contrast to the rods 62 being located in close proximity to substantially planar edges of a leaf spring, as required in prior art designs. The presence of the recesses 70 allow for some or all of the leaf spring 52 to be widened (in cross-car direction) in design, while avoiding the need for a complete restructuring of the clamping assembly 60 components. Widening of the leaf spring 52, whether localized at the clamp assembly 60 location or generally, refers to providing design width flexibility, but maintaining desired spring characteristics and avoiding unacceptable stress concentration at the recess 70.

Figure 5A:
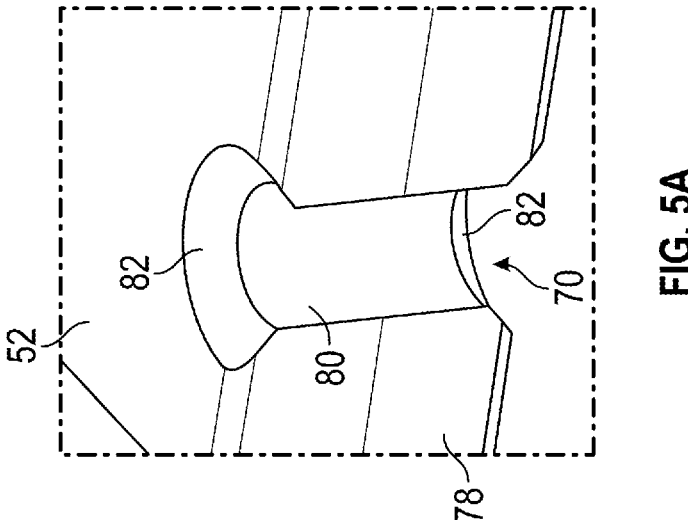
FIG. 5A is an enlarged view of one of the recesses of the leaf spring having an angled wall.
Figure 5C:
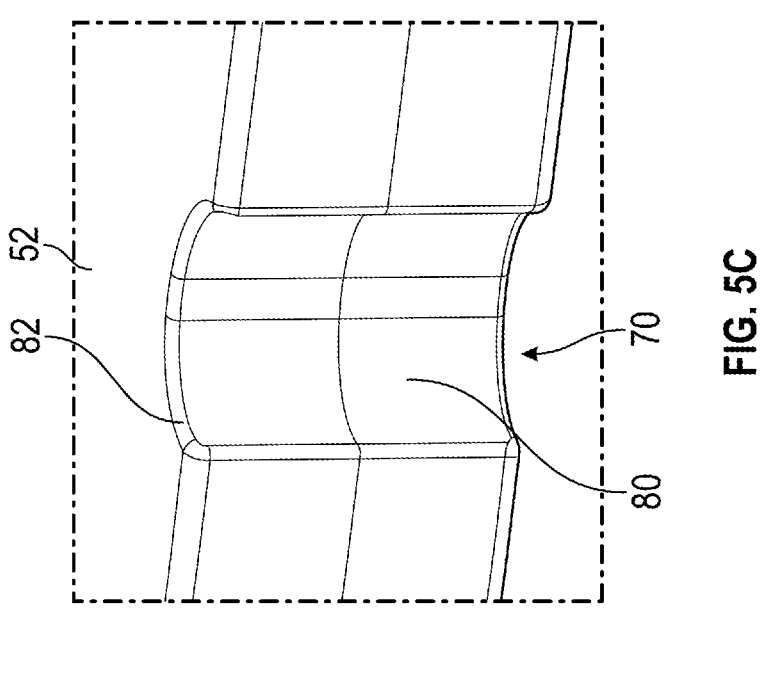
FIG. 5C is an enlarged view of one of the recesses of the leaf spring of FIG. 5B.
Figure 5B:
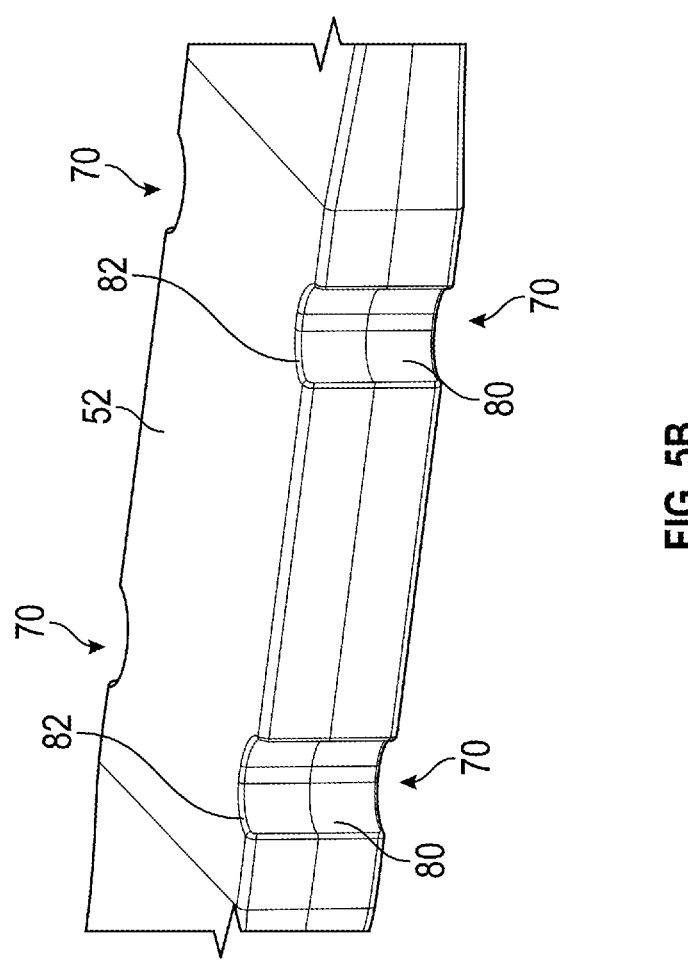
FIG. 5B is a perspective view of the recesses of the leaf spring having a curved wall according to another aspect of the disclosure.

The recesses 70 (only one shown in enlarged views of FIGS. 5A and 5C) extend completely from the top side of the leaf spring 52 to the bottom side of the leaf spring 52 and protrude inwardly from a side edge 78 of the leaf spring 52. The recess 70 is defined by a recess wall 80 that has a geometric profile characterized by an elliptical shape. However, it is contemplated that a circular geometry may be utilized in other embodiments. Proximate an upper region of the recess 70, the recess wall 80 transitions to a "scallop" shaped wall 82, defined by a wall that has curvature away from the recess wall 80, as shown in FIGS. 5B and 5C. The scallop shaped wall 82 has slight curvature in the illustrated embodiment. However, it is to be appreciated that a substantially planar angle may be present in some embodiments, as shown in FIG. 5A.

Figure 6:
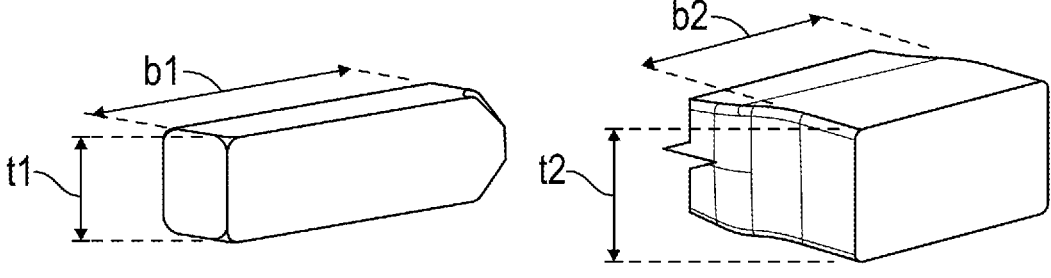
FIG. 6 is a cross-sectional view of two leaf springs illustrating dimensional relationships of each leaf spring.
Figure 7:
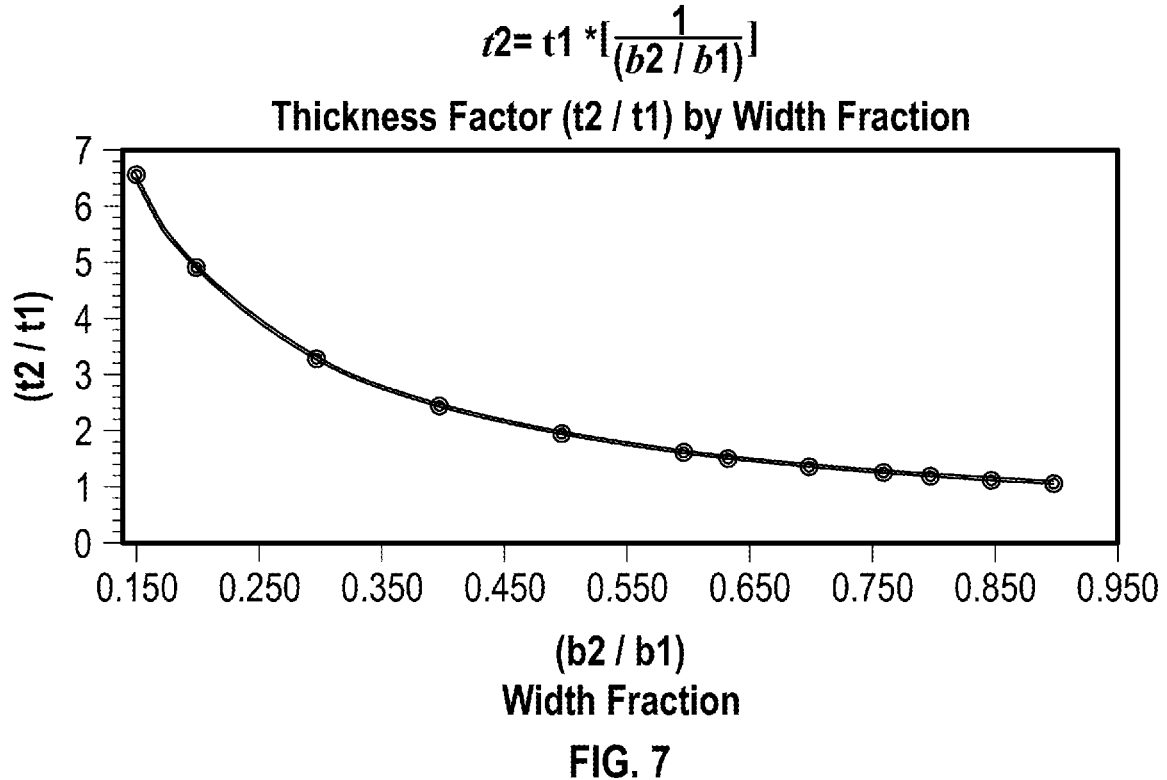
FIG. 7 is a plot of a thickness ratio vs. a width ratio of leaf springs of differing dimensions.

As described above, the recesses 70 accommodate the U-shaped rods 62 therein when a widening of the leaf spring 52 is desired. Referring to FIG. 6, the width of two example leaf springs are shown and represented with b1 and b2, while the thickness of each leaf spring is shown and represented with t1 and t2. These dimensions are located at the region of the leaf spring 52 that corresponds to the location of the clamping assembly 60. The cross-sectional area (b1×t1 and b2×t2) at this location remains constant over varying designs. Therefore, the thickness of the spring is decreased as the width of the spring is increased, as shown. FIG. 7 shows the thickness ratio plotted against the width ratio.

Figure 8:
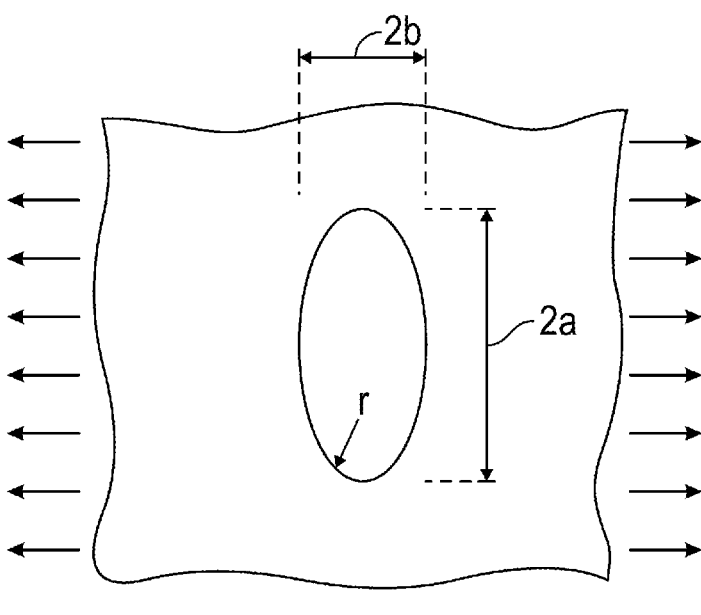
FIG. 8 illustrates a general stress factor formula for an oval shape.
Figure 9:
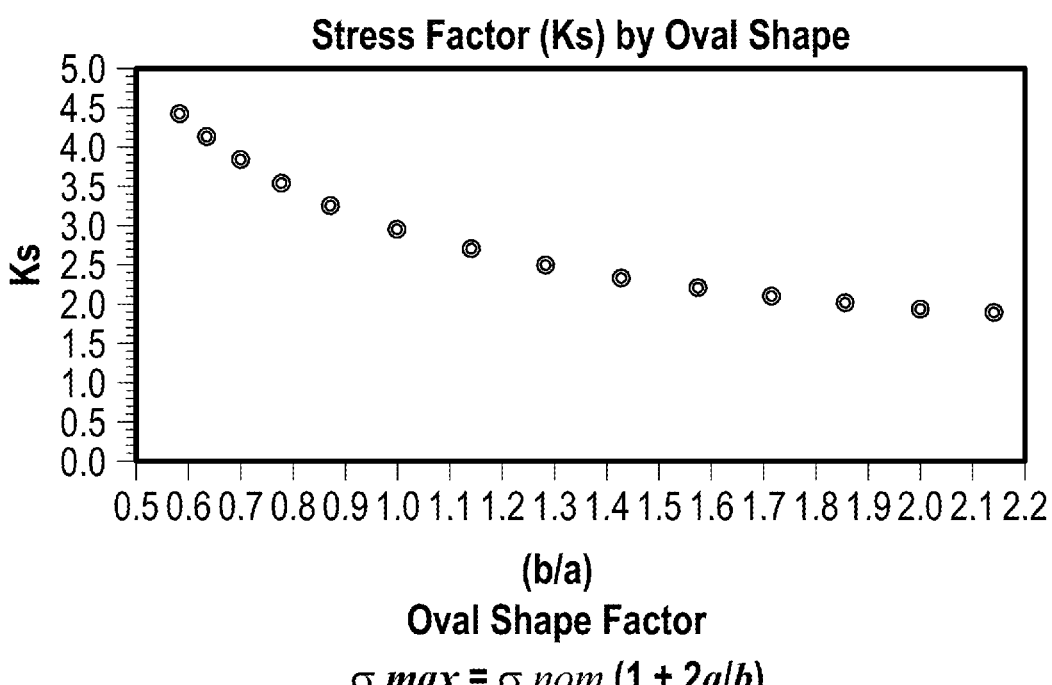
FIG. 9 is a plot of stress factor vs. an oval shape factor.

FIG. 8 illustrates the general stress formula for an ellipse. As discussed above, the recess 70 has an elliptical geometry in some embodiments. The stress factor can be calculated as a function of the major and minor diameters of the ellipse. FIG. 8 is a plot of the stress factor ($K_s$) against the minor diameter/major diameter factor.

Figure 12C:
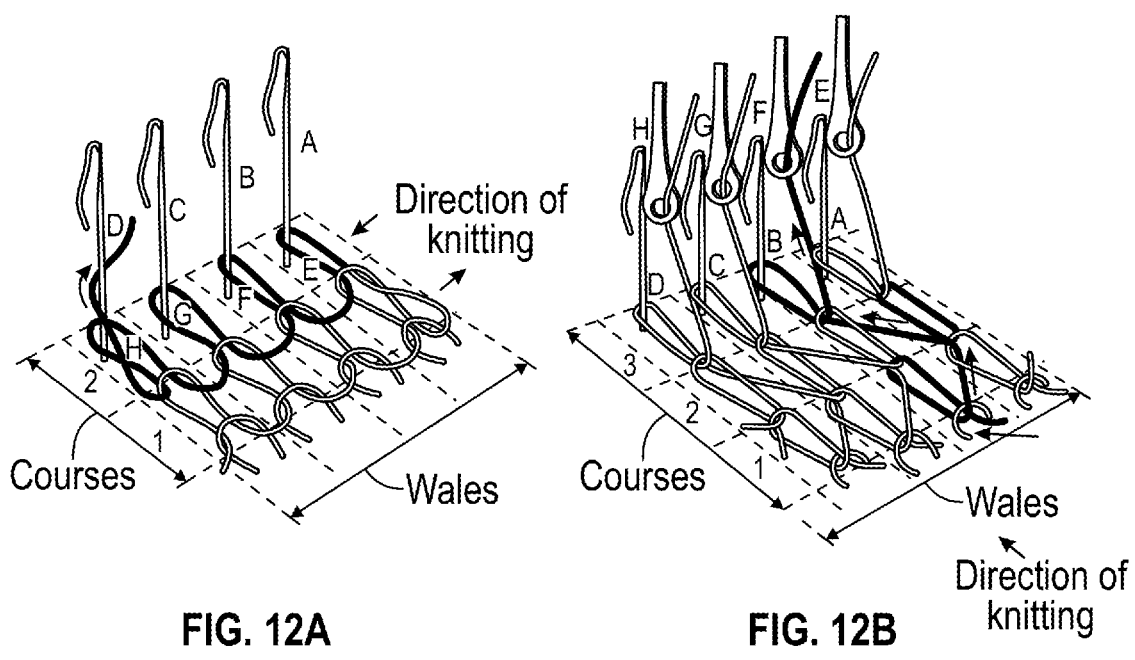
Figure 12C:
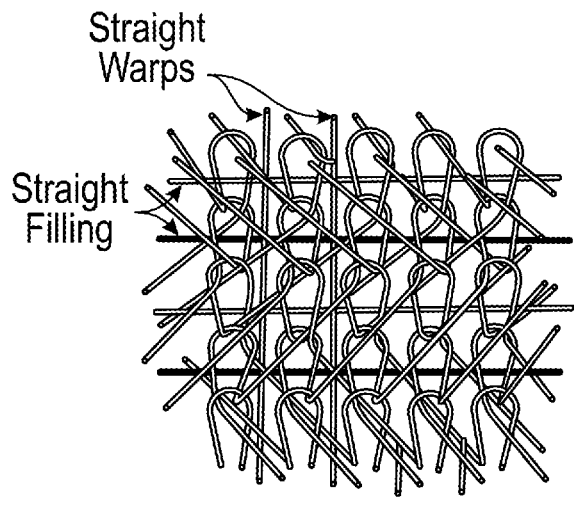
Figures 12D, 13:
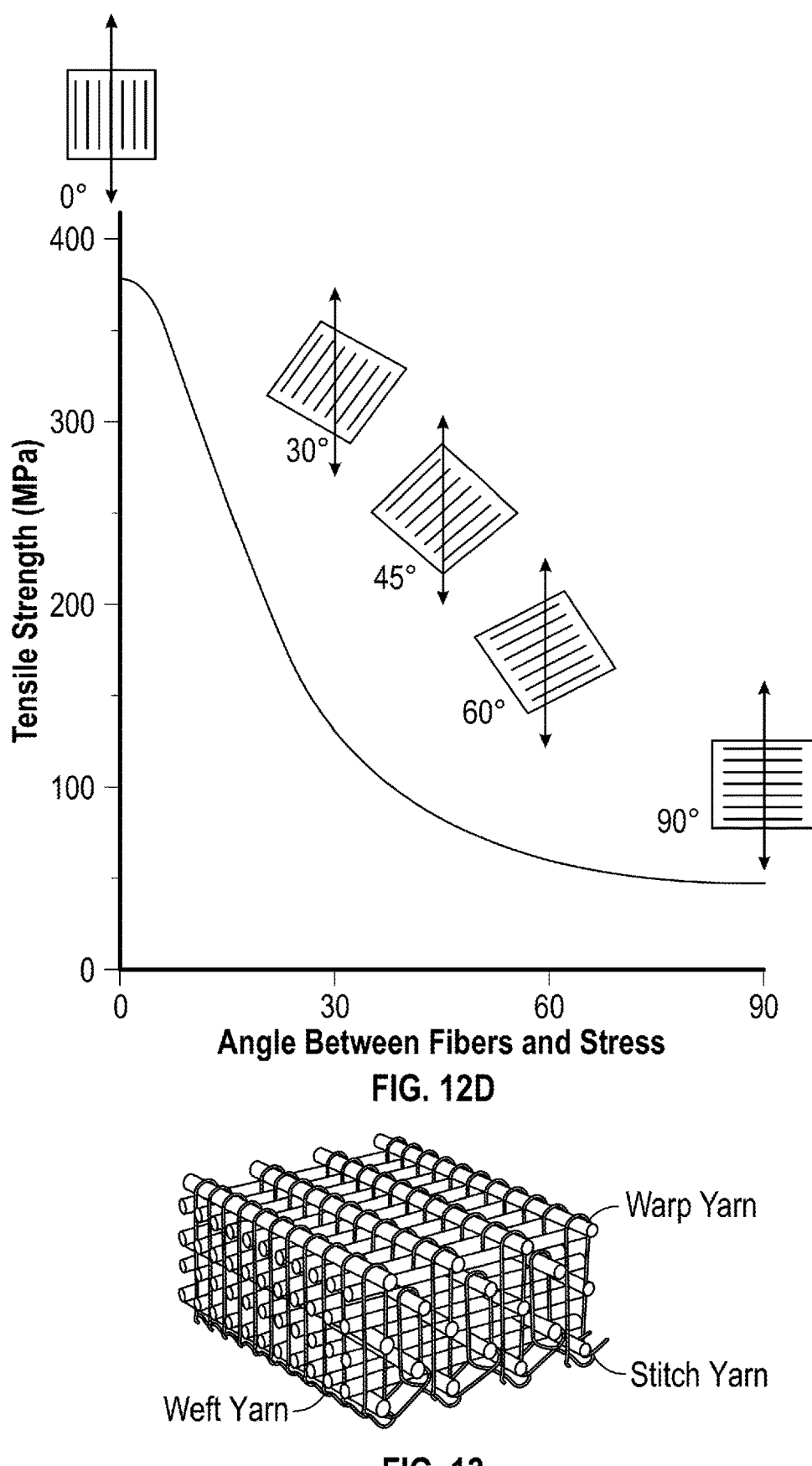
Figure 14A:
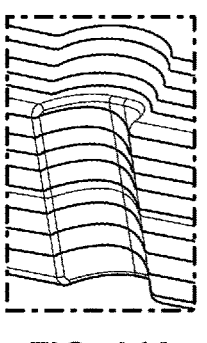
FIGS. 14A-14D illustrates a group of fiber arrangements.
Figure 14B:
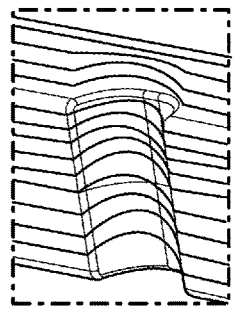
Figure 14C:
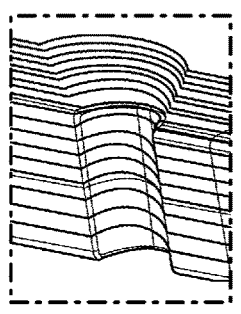
Figure 14D:
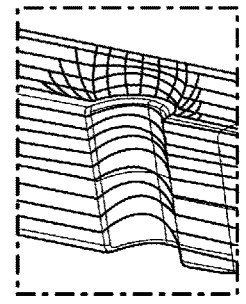
Figure 15A:
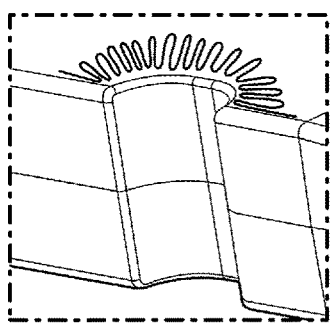
FIGS. 15A-15D illustrates a group of fiber arrangements.
Figure 15B:
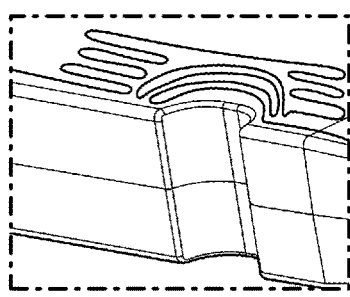
Figure 15C:
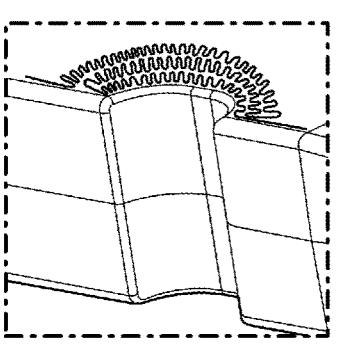
Figure 15D:
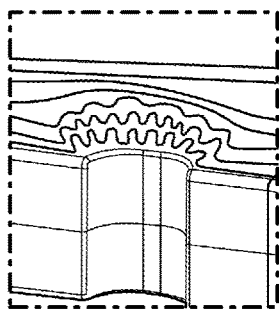

To reinforce the scallop shaped wall 82 region of the recess 70 and to reduce stress concentration, different fiber arrangements may be utilized in the scallop shaped wall 82 region. In some embodiments, the reinforcement fiber arrangement may be disposed in the scallop shaped wall and all or part of the recess wall 80. In other words, the reinforcement structure may be partial or complete along the structural walls that define the recess 70 and the associated scallop. For example, woven, non-crimped in a variety of directions, meshed, rovings and knitted fabrics at 2D and 3D level may be provided (FIG. 10). For non-crimp fabric arrangements, different stitching geometries may be employed (FIG. 11). Additionally, full preform can be manufactured by using tailored fiber placement technology with different rovings. Likewise, the nature of the fibers used in this strategy can be either glass, carbon, aramid, ceramic, or metal, depending of the strength requirements. The fiber arrangement and nature of fibers may be used at different volume fractions in the same component, as well as at different angles between the fibers and the stress area (FIGS. 12A-12D). During the component fabrication, the previous arrangement may be used by reinforcing the particular curvature (top and bottom) and a complete reinforcement area (top-center-bottom) as part of in-molding process (FIG. 13). Fabrication processes of this geometry can be compression molding, filament winding molding, resin transfer molding and injection molding. Finally, these materials can be processed in-mold as well as after-molding depending of the manufacturing process technology. The processes discussed above are merely examples of the structures that may be relied upon. FIGS. 14A-14D and 15A-15D illustrate two groups of fiber arrangements according to the embodiments contemplated herein.

The embodiments disclosed herein enable vehicles to use wider leaf springs while vehicle hardware modifications are eliminated or reduced. This promotes carryover of vehicle components between current and new platforms and reduces new suspension development cycles by fitting in current vehicle architectures. The embodiments allow simplification of sub-system and vehicle evaluation due to the carry over components. The embodiments avoid an increase in clamp group weight (assembly and components) due to maintaining OE width at the axle perch.

Although the invention has been described in terms of specific embodiments and applications, persons skilled in the art may, in light of this teaching, generate additional embodiments without exceeding the scope or departing from the spirit of the invention described herein. Accordingly, it is to be understood that the drawing and description in this disclosure are proffered to facilitate comprehension of the invention, and should not be construed to limit the scope thereof

What is claimed is:

1. A leaf spring suspension system for a vehicle comprising:
   an axle;
   a leaf spring having a top side, a bottom side, and a pair of side edges, wherein at least one of the side edges defines a pair of recesses extending inwardly from the side edge; and
   a clamping assembly operatively coupling the leaf spring to the axle, the clamping assembly comprising a pair of U-shaped bars, wherein a portion of the U-shaped bars is directly seated within the pair of recesses of the leaf spring, wherein the pair of recesses protrude inwardly from a side edge of the leaf spring and extend completely from the top side of the leaf spring to the bottom side of the leaf spring, each recess being defined by a recess wall, wherein a top region of the recess is defined by a scallop shaped wall extending away from the recess wall and connecting the recess wall to the top side of the leaf spring, and wherein a bottom region of the recess is defined by a scallop shaped wall extending away from the recess wall and connecting the recess wall to the bottom side of the leaf spring.

2. The leaf spring suspension system of claim 1, wherein the pair of recesses comprises an elliptical geometric cross-section.

3. The leaf spring suspension system of claim 2, wherein the leaf spring is formed of a composite material, the strength of the leaf spring is configured to be increased with a tailored fiber placement arrangement disposed within at least a portion of the recess.

4. The leaf spring suspension system of claim 1, wherein the pair of recesses comprises a circular geometric cross-section.

5. The leaf spring suspension system of claim 1, wherein the scallop shaped wall at the top region of each recess is a curved segment connecting the recess wall to the top side of the leaf spring.

6. The leaf spring suspension system of claim 1, wherein the scallop shaped wall at the top region of each recess is a planar angled segment connecting the recess wall to the top side of the leaf spring.

7. The leaf spring suspension system of claim 1, wherein a bottom region of each recess is defined by a scallop shaped wall extending away from the recess wall.

8. The leaf spring suspension system of claim 7, wherein the scallop shaped wall at the bottom region of each recess is a curved segment connecting the recess wall to the bottom side of the leaf spring.

9. The leaf spring suspension system of claim 7, wherein the scallop shaped wall at the bottom region of each recess is a planar angled segment connecting the recess wall to the bottom side of the leaf spring.

10. The leaf spring suspension system of claim 1, wherein the leaf spring is formed of a composite material.

11. The leaf spring suspension system of claim 1, wherein the leaf spring is formed of at least one of metal(s), reinforced polymers, and other combination materials.

12. A method of designing a clamping assembly for a vehicle leaf spring suspension comprising:
   determining a width and thickness of a leaf spring; and
   determining a shape and dimension of a recess defined by a side edge of the leaf spring, the recess configured to have a portion of a leg of a clamp bar directly seated therein, wherein determining the shape and dimension of the recess defined by a side edge of the leaf spring, the recess extending completely from the top side of the leaf spring to the bottom side of the leaf spring and protruding inwardly from a side edge, is based on material stress limit calculations.

13. The method of claim 12, wherein determining the width and thickness of the leaf spring is based on a section modulus of the leaf spring.

\* \* \* \* \*